United States Patent
Bertolini et al.

(10) Patent No.: US 11,840,336 B2
(45) Date of Patent: Dec. 12, 2023

(54) ANTIVIBRATION KIT-OF-PARTS AND PARTS THEREFOR, AIRFOIL STRUCTURE AND AIRCRAFT PROVIDED THEREWITH

(71) Applicant: Airbus Operations GmbH, Hamburg (DE)

(72) Inventors: Ivano Bertolini, Hamburg (DE); Henrik Lüttmann, Hamburg (DE); Wim Westbroek, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 82 days.

(21) Appl. No.: 17/424,808

(22) PCT Filed: May 26, 2020

(86) PCT No.: PCT/EP2020/064550
§ 371 (c)(1),
(2) Date: Jul. 21, 2021

(87) PCT Pub. No.: WO2020/239753
PCT Pub. Date: Dec. 3, 2020

(65) Prior Publication Data
US 2022/0089272 A1    Mar. 24, 2022

(30) Foreign Application Priority Data

May 28, 2019  (DE) .......................... 102019114313.6

(51) Int. Cl.
*B64C 9/02*    (2006.01)
*B64C 13/32*   (2006.01)
*F16F 1/368*   (2006.01)

(52) U.S. Cl.
CPC ................ *B64C 9/02* (2013.01); *B64C 13/32* (2013.01); *F16F 1/3686* (2013.01); *F16F 2238/022* (2013.01)

(58) Field of Classification Search
CPC .......... B64C 9/02; B64C 13/32; F16F 1/3686; F16F 2238/022; F16F 1/20
See application file for complete search history.

(56) References Cited

U.S. PATENT DOCUMENTS 1,371,166 A  *  3/1921  Hamilton .................. F16F 1/20
                                                        267/50
2,471,857 A     5/1949  Bleakney et al.
(Continued)

FOREIGN PATENT DOCUMENTS

BE    349173 A     2/1928
DE    2349662 A    5/1974
(Continued)

OTHER PUBLICATIONS

International Search Report; priority document, Pub dated Nov. 12, 2020.

(Continued)

*Primary Examiner* — Rodney A Bonnette
(74) *Attorney, Agent, or Firm* — Greer, Burns & Crain, Ltd.

(57) ABSTRACT

To reduce vibration of movable airfoil structures, such as rudders, elevators, and ailerons, a spring device, a leaf spring for example, is mounted to an airfoil mounting structure, such as a vertical tail plane, horizontal tail plane or the wings, such that the spring device exerts a force on a cam device, which transforms the spring force into an airfoil torque. The airfoil torque is applied to the airfoil structure and thus reduces a risk of vibration. The cam device is configured to redirect the spring force such that when the airfoil structure is moved in a first direction, torque decreases and when moved in the opposite second direction the torque is zero.

18 Claims, 10 Drawing Sheets

(56) References Cited

U.S. PATENT DOCUMENTS

| | | | |
|---|---|---|---|
| 3,282,069 A | 11/1966 | Wermlinger | |
| 3,832,895 A | 9/1974 | Strandh | |
| 4,753,402 A | 6/1988 | Cole | |
| 2005/0178897 A1 | 8/2005 | Moreno | |
| 2014/0014781 A1 | 1/2014 | Hanlon et al. | |
| 2014/0312543 A1* | 10/2014 | Nakagawa | F16F 1/18 |
| | | | 267/158 |
| 2016/0159183 A1* | 6/2016 | Basin | B60G 13/04 |
| | | | 280/124.108 |
| 2019/0078636 A1* | 3/2019 | Yano | F16F 1/26 |

FOREIGN PATENT DOCUMENTS

| | | |
|---|---|---|
| DE | 3643157 A1 | 7/1987 |
| EP | 1550607 A1 | 7/2005 |
| FR | 571743 A | 5/1924 |
| FR | 1381162 A | 12/1964 |
| FR | 2529839 A1 | 1/1984 |
| KR | 20090069079 A | 6/2009 |

OTHER PUBLICATIONS

German Search Report; priority document, Pub dated Feb. 11, 2020.

* cited by examiner

ANTIVIBRATION KIT-OF-PARTS AND PARTS THEREFOR, AIRFOIL STRUCTURE AND AIRCRAFT PROVIDED THEREWITH

CROSS-REFERENCES TO RELATED APPLICATIONS

This application claims the benefit of the International Application No. PCT/EP2020/064550, filed on May 26, 2020, and of the German patent application No. 102019114313.6 filed on May 28, 2019, the entire disclosures of which are incorporated herein by way of reference.

FIELD OF THE INVENTION

The invention relates to an antivibration kit-of-parts configured for reducing vibration of an airfoil structure. The invention further relates to an airfoil structure and an aircraft using the kit-of-parts as well as parts for the kit of parts.

BACKGROUND OF THE INVENTION

Control surfaces, such as rudders, elevators, ailerons, elevons and the like, may start to flutter or vibrate due to air flow, in particular, in cruise conditions. While this may be counteracted actively via the hydraulic system, there is a desire for a simpler stand-alone approach.

SUMMARY OF THE INVENTION

It is an object of the invention to provide measures which improve resilience, in particular, of control surfaces, against vibration or flutter in aircraft.

The invention provides an antivibration kit-of-parts configured for reducing vibration of an airfoil structure, the airfoil structure being movably attachable to an aircraft, wherein the antivibration kit-of-parts comprises a spring device configured for generating a spring force due to deflection from a spring neutral position of the spring device, and a cam device configured for transforming the spring force into an airfoil torque while, when both the spring device and the cam device are in an operating condition, the cam device contacts the spring device, and the cam device is configured for applying the airfoil torque to the airfoil structure while, when both the spring device and the cam device are in an operating condition, the cam device is operatively coupled to the airfoil structure.

Preferably, the cam device is configured to be rotatable about an axis of rotation, so as to transform the spring force into the airfoil torque.

Preferably, the cam device is configured to transform the spring force into the airfoil torque being nonzero, when the cam device is moved from a cam device neutral position in a first direction but not another direction.

Preferably, the cam device is configured to transform the spring force into the airfoil torque being zero when the cam device is moved from a cam device neutral position in a second direction but not another direction, although the spring device stays in contact with the cam device.

Preferably, the cam device is configured to transform the spring force into the airfoil torque being zero by directing the spring force to point towards the axis of rotation.

Preferably, when both the spring device and the cam device are in the operating condition, the spring device is deflected when the cam device is in a cam device neutral position.

Preferably, when both the spring device and the cam device are in the operating condition, the deflection of the spring device decreases when the cam device is moved from a cam device neutral position in a first direction but not another direction.

Preferably, when both the spring device and the cam device are in the operating condition, the deflection of the spring device stays the same, when the cam device is moved from a cam device neutral position in a second direction but not another direction.

Preferably, when both the spring device and the cam device are in the operating condition, the deflection of the spring device initially increases and subsequently stays the same, when the cam device is moved from a cam device neutral position in a second direction but not another direction.

Preferably, the spring device comprises a leaf spring configured to generate the spring force.

Preferably, the leaf spring comprises a plurality of leaf spring layers stacked on each other in a sliding manner.

Preferably, the leaf spring has a fixed end portion, at which the leaf spring layers are fixed to each other.

Preferably, the leaf spring has a free end portion, at which the leaf spring layers are free to slide relative to each other.

Preferably, the leaf spring comprises a friction reducing member sandwiched between two neighboring leaf spring layers.

Preferably, the leaf spring has a leaf spring bracket configured to support the leaf spring layers in a sliding manner.

Preferably, the leaf spring bracket is arranged at the free end.

Preferably, the spring device comprises a contact portion arranged for contacting the cam device, so as to transfer the spring force to the cam device.

Preferably, the contact portion is arranged at the free end or the leaf spring bracket.

Preferably, the contact portion comprises a roller, which contacts the cam device.

Preferably, the spring device comprises a reinforcement member configured for reinforcing the spring device.

Preferably, the reinforcement member is arranged at the fixed end portion.

Preferably, the cam device comprises a cam device mounting portion configured for mounting the cam device to the airfoil structure.

Preferably, the cam device comprises hinge portion defining an axis of rotation about which the cam device is rotatable.

Preferably, the cam device comprises a stationary cam portion configured for directing the spring force in such a manner that, when the cam device is in the operating condition, the spring force is directed in the same direction relative to the aircraft for a majority of a movement of the cam device relative to the aircraft.

Preferably, the stationary cam portion comprises an urging cam portion configured for directing the spring force such that, when the cam device is in the operating condition, the spring force is directed parallel to a lateral direction, preferably a left-right-direction or a top-bottom-direction, of the aircraft.

Preferably, the stationary cam portion comprises a neutral cam portion configured for directing the spring force such that, when the cam device is in the operating condition, the spring force is directed towards an axis of rotation of the cam device.

Preferably, the cam device comprises a transition cam portion configured for changing the direction of action of the spring force between a lateral direction, preferably a left-right-direction or a top-bottom-direction, of the aircraft and a direction towards an axis of rotation of the cam device.

Preferably, the transition cam portion is formed adjacent to the cam portion.

Preferably, the transition cam portion is formed adjacent to the urging cam portion.

Preferably, the transition cam portion is formed adjacent to the neutral cam portion.

Preferably, the transition cam portion is sandwiched between the urging cam portion and the neutral cam portion.

Preferably, the cam portion is partially arranged on a single lateral side of the cam device.

Preferably, the cam portion is partially arranged on a single front side of the cam device.

Preferably, the cam portion is completely arranged on a single lateral and front side of the cam device.

Preferably, the neutral cam portion is configured to avoid changing the magnitude of the spring force.

Preferably, the neutral cam portion is configured to avoid changing the deflection of the spring device.

Preferably, the neutral cam portion is formed as a circular arc.

Preferably, the urging cam portion is configured to avoid changing the direction of the spring force.

Preferably, the urging cam portion is formed as a cycloidal shape.

The invention provides an airfoil structure arrangement for an aircraft, the airfoil structure arrangement comprising an airfoil mounting structure, an airfoil structure movably mounted to the airfoil mounting structure, and a preferred antivibration kit-of-parts, wherein the spring device is mounted to the fixed airfoil structure and the cam device is mounted to the movable airfoil structure.

Preferably, the airfoil mounting structure comprises a wing.

Preferably, the airfoil mounting structure comprises a vertical tail plane.

Preferably, the airfoil mounting structure comprises a horizontal tail plane.

Preferably, the airfoil structure comprises a control surface.

Preferably, the control surface is a rudder.

Preferably, the control surface is an elevator

Preferably, the control surface is an aileron.

Preferably, the control surface is an elevon.

Preferably, the control surface is a spoileron.

Preferably, the airfoil structure comprises high lift device.

Preferably, the cam device is mounted to be rotatable about an axis of rotation, so as to transform the spring force into the airfoil torque and drive the movable airfoil structure.

Preferably, the cam device is configured to transform the spring force into the airfoil torque being nonzero, when the cam device is moved from a cam device neutral position in a first direction but not another direction.

Preferably, the cam device is configured to transform the spring force into the airfoil torque being zero when the cam device is moved from a cam device neutral position in a second direction but not another direction, although the spring device stays in contact with the cam device.

Preferably, the cam device is configured to transform the spring force into the airfoil torque being zero by directing the spring force to point towards the axis of rotation.

Preferably, the spring device is deflected when the cam device is in a cam device neutral position.

Preferably, the deflection of the spring device decreases when the cam device is moved from a cam device neutral position in a first direction but not another direction.

Preferably, the deflection of the spring device stays the same, when the cam device is moved from a cam device neutral position in a second direction but not another direction.

Preferably, the deflection of the spring device initially increases and subsequently stays the same, when the cam device is moved from a cam device neutral position in a second direction but not another direction.

Preferably, the spring device comprises a leaf spring configured to generate the spring force.

Preferably, the leaf spring comprises a plurality of leaf spring layers stacked on each other in a sliding manner.

Preferably, the leaf spring has a fixed end portion, at which the leaf spring layers are fixed to each other.

Preferably, the leaf spring has a free end portion, at which the leaf spring layers are free to slide relative to each other.

Preferably, the leaf spring comprises a friction reducing member sandwiched between two neighboring leaf spring layers.

Preferably, the leaf spring has a leaf spring bracket configured to support the leaf spring layers in a sliding manner.

Preferably, the leaf spring bracket is arranged at the free end.

Preferably, the spring device comprises a contact portion arranged for contacting the cam device, so as to transfer the spring force to the cam device.

Preferably, the contact portion is arranged at the free end or the leaf spring bracket.

Preferably, the contact portion comprises a roller, which contacts the cam device.

Preferably, the spring device comprises a reinforcement member configured for reinforcing the spring device.

Preferably, the reinforcement member is arranged at the fixed end portion.

Preferably, the cam device comprises hinge portion defining the axis of rotation about which the cam device is rotatable.

Preferably, the cam device comprises a stationary cam portion configured for directing the spring force in such a manner that the spring force is directed in the same direction relative to the aircraft for a majority of a movement of the cam device relative to the aircraft.

Preferably, the stationary cam portion comprises an urging cam portion configured for directing the spring force such that the spring force is directed parallel to a lateral direction, preferably a left-right-direction or a top-bottom-direction, of the aircraft.

Preferably, the stationary cam portion comprises a neutral cam portion configured for directing the spring force such that the spring force is directed towards an axis of rotation of the cam device.

Preferably, the cam device comprises a transition cam portion configured for changing the direction of action of the spring force between a lateral direction, preferably a left-right-direction or a top-bottom-direction, of the aircraft and a direction towards an axis of rotation of the cam device.

Preferably, the transition cam portion is formed adjacent to the stationary cam portion.

Preferably, the transition cam portion is formed adjacent to the urging cam portion.

Preferably, the transition cam portion is formed adjacent to the neutral cam portion.

Preferably, the transition cam portion is sandwiched between the urging cam portion and the neutral cam portion.

Preferably, the cam portion is partially arranged on a single lateral side of the cam device.

Preferably, the cam portion is partially arranged on a single front side of the cam device.

Preferably, the cam portion is completely arranged on a single lateral and front side of the cam device.

Preferably, the neutral cam portion is configured to avoid changing the magnitude of the spring force.

Preferably, the neutral cam portion is configured to avoid changing the deflection of the spring device.

Preferably, the neutral cam portion is formed as a circular arc.

Preferably, the urging cam portion is formed is configured to avoid changing the direction of the spring force.

Preferably, the urging cam portion is formed as a cycloidal shape.

The invention provides an aircraft, in particular an airplane, comprising a preferred airfoil structure.

The invention provides a leaf spring suitable for a preferred antivibration kit-of-parts, wherein the leaf spring comprises a plurality of leaf spring layers stacked on each other in a sliding manner, a fixed end portion, at which the leaf spring layers are fixed to each other, and a free end portion, at which the leaf spring layers are free to slide relative to each other. The leaf spring may be configured according to any preferred embodiment previously described.

The invention provides a cam device suitable for a preferred antivibration kit-of-parts, wherein the cam device comprises a cam device mounting portion configured for mounting the cam device to an airfoil structure, a hinge portion defining an axis of rotation about which the cam device is rotatable, and a cam portion configured for directing a spring force exerted on the cam portion in such a manner that, when the cam device is in the operating condition, the spring force is directed in the same direction relative to an aircraft for a majority of a rotation of the cam device relative to the aircraft. The cam device may be configured according to any preferred embodiment previously described.

The basic idea is to install a cam device in the vertical tail plane (VTP), for example. The cam device aims to apply a permanent torque on the rudder, when its deflection is zero degrees and decreases the torque with increasing rudder angle, when the rudder is moved to either side. By applying this torque, vibrations on movable structures, in particular in a cruise condition, may be reduced. Thus, wear is reduced, so that an increase in limit cycle oscillations (LCO) severity is avoided. While a solution could be based on light metal material (titanium, aluminum, etc.), another solution may use fiber composite materials, such as carbon fiber reinforced plastics (CFRP) or glass fiber reinforced plastics (GFRP). Using composites, the same function can be achieved while at the same time weight of the device is reduced. In addition to being lighter and significantly cheaper and easier to install, the cam device may also be installed to any hinge fitting present in an aircraft. In other words, the cam device and corresponding spring device are compatible with any wing, horizontal tail plane (HTP), vertical tail plane (VTP) and corresponding movable surfaces potentially affected by vibrations, such as high lift devices and control surfaces. Furthermore, the idea is applicable to any type aircraft but preferably airplanes.

According to these basic ideas, for a large commercial aircraft an exemplary permanent torque of about 2500 Nm may be applied on the vertical tail plane and the rudder by the spring device. The permanent torque depends on the control surface to which it is applied. The ideas presented herein are also adaptable to smaller or even bigger aircraft sizes. The spring device, for example, is made as a composite spring, which is attached to a rudder hinge arm. The torque is applied by deforming the spring, which due to its deflection generates a spring force which is subsequently converted into a torque by the cam device. It is possible to adapt the concept to a desired torque or desired size/geometry.

It is preferable, to provide an antivibration kit-of-parts, so that the ideas presented herein may be retrofitted to aircraft currently in operation, during routine servicing for example. The spring device and the cam device are in contact with each other, but not fixed to each other. The spring device generates in a well-known manner a spring force due to deflection of the spring device from a neutral position. The cam device may be mounted to an airfoil structure, such as a rudder.

While the cam device is able to deflect the spring device due to movement of the rudder, one preferred function of the cam device is to control the angle along which the spring force generated by the spring device is acting. The cam device is preferably shaped in an asymmetrical manner, such that, when the rudder and hence the cam device is being moved in one direction, the deflection of the spring device and hence the magnitude of the generated spring force decreases. In other words, the spring acts only in one direction. In this case, the cam device may be shaped such that the spring force acts perpendicular to the longitudinal direction of the aircraft, when the components are installed.

Similarly, if the rudder is moved in the opposite direction, the deflection of the spring device increases, and hence the spring force increases. During this phase, the cam device redirects the angle of the spring force such that at the end of this movement phase the force vector is pointing towards the axis of rotation. Thus, the perpendicular force is decreased by the shape of the cam. After that, the cam device is shaped preferably in such a manner that the spring device is no more deflected and has reached a particular deflection. Thus, the magnitude of the spring force doesn't change in this phase in anymore. Furthermore, the cam device is shaped preferably such that the force vector of the spring force is kept pointing towards the axis of rotation so that no torque is generated.

As a result, an asymmetric torque characteristic is achieved, which allows the application of substantial torque to the rudder in the cruise condition, so as to avoid or reduce vibrations, whereas movement of the rudder is barely impaired.

BRIEF DESCRIPTION OF THE DRAWINGS

Advantageous embodiments are described with reference to the figures listed below.

DETAILED DESCRIPTION OF THE PREFERRED EMBODIMENTS

Figure 1:
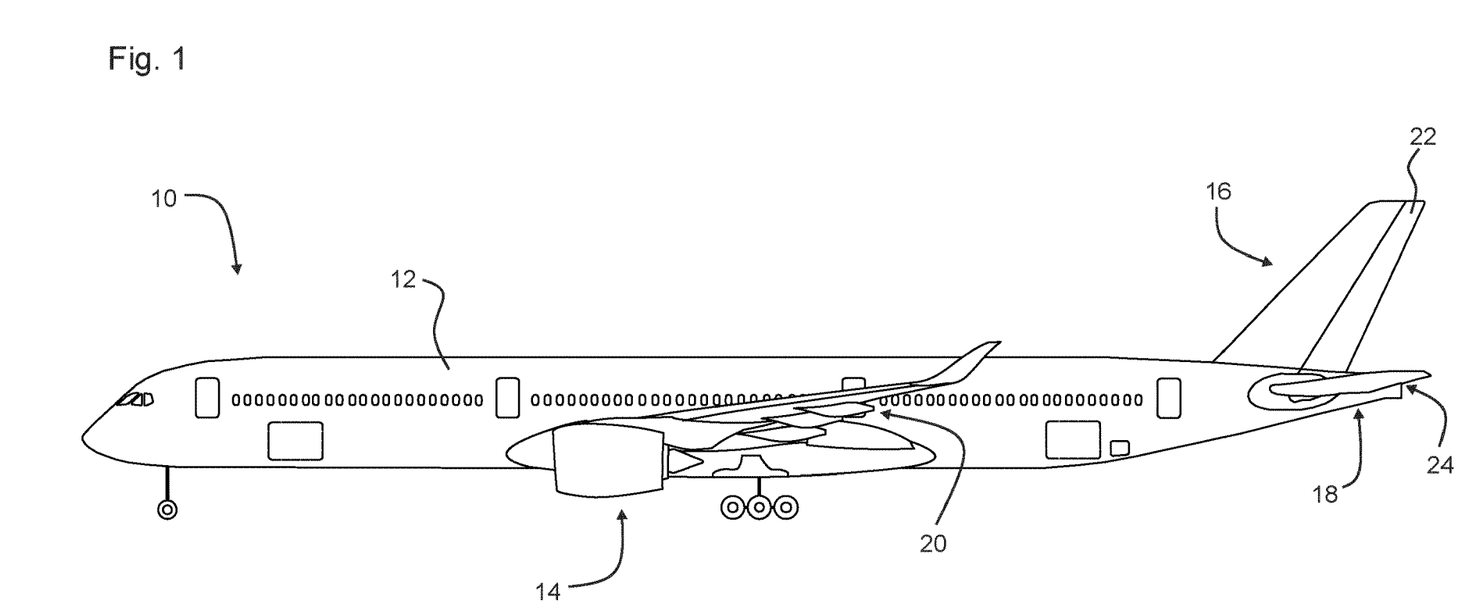
FIG. 1 shows a side view of an aircraft.

FIG. 1 depicts an aircraft 10. In a typical manner, the aircraft 10 has a fuselage 12. Furthermore, the aircraft 10 comprises wings 14, a vertical tail plane 16, and a horizontal tail plane 18. The wing 14 comprises ailerons 20. The vertical tail plane 16 has a rudder 22 attached to it. Furthermore, the horizontal tail plane 18 comprises an elevator 24.

For the sake of brevity, the invention is described in more detail with reference to the vertical tail plane 16 and the rudder 22. However, the skilled person will recognize that the ideas presented herein are also applicable to the wing 14 and the ailerons 20 as well as the horizontal tail plane 18 and the elevator 24. Furthermore, these ideas are applicable to combinations of control surfaces such as elevons and spoilerons.

Figure 2:
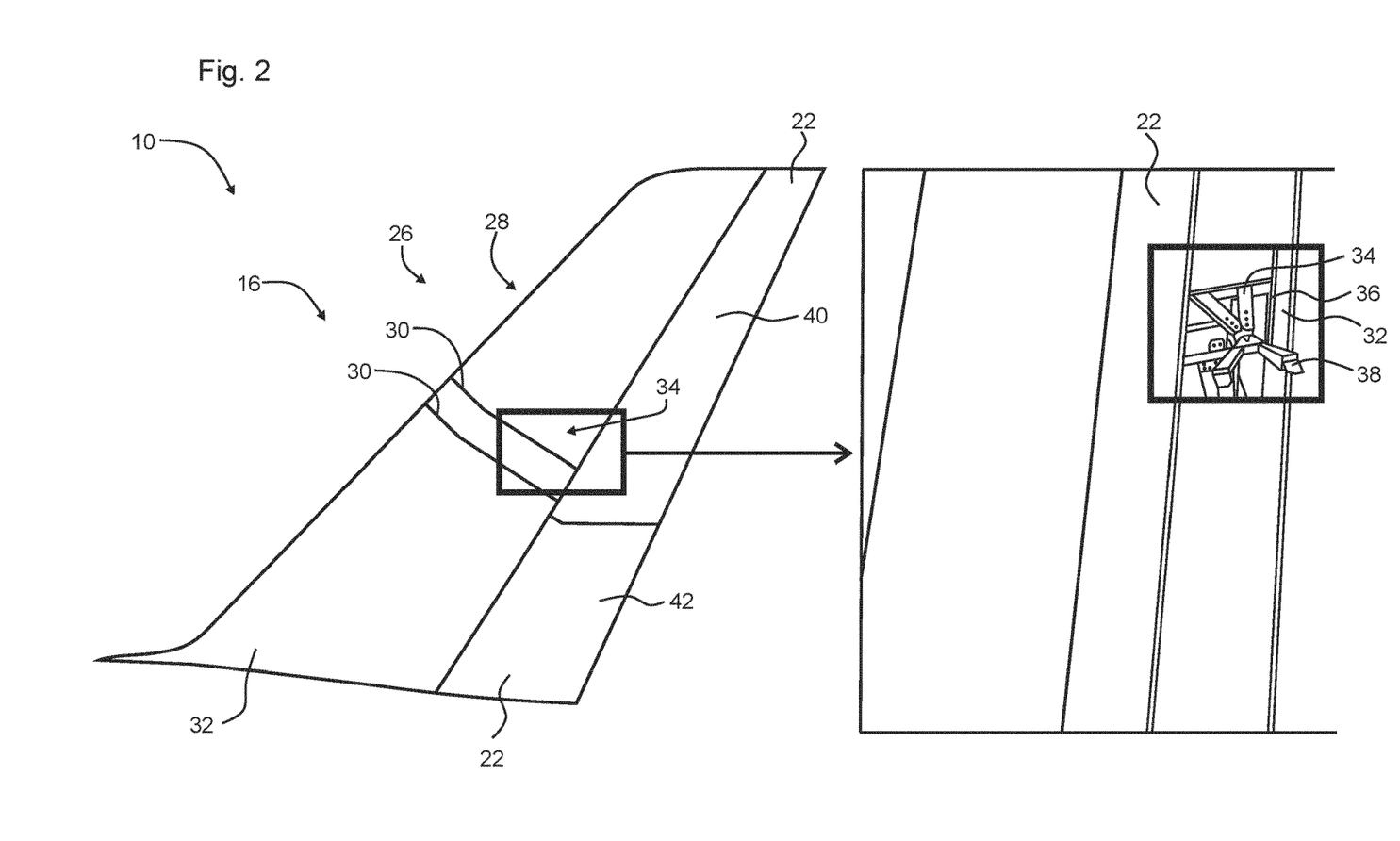
FIG. 2 shows a detailed view of a VTP.

FIG. 2 depicts in more detail the vertical tail plane 16 as an example for an airfoil structure arrangement 26. The airfoil structure arrangement 26 comprises a airfoil mounting structure 28. The airfoil mounting structure 28 may comprise a plurality of ribs 30, which are covered in manner known per se by an aerodynamic skin 32. In addition, the airfoil mounting structure 28 comprises a plurality of mounting brackets 34, which provide a hinge 36 for the rudder 22.

The airfoil structure arrangement 26 further comprises the rudder 22 as an example for a airfoil structure 38. The airfoil structure 38 is movably, in this case rotatably, mounted to the airfoil mounting structure 28. In the present example, the airfoil structure 38 has an upper part 40 and a lower part 42.

Figure 3:
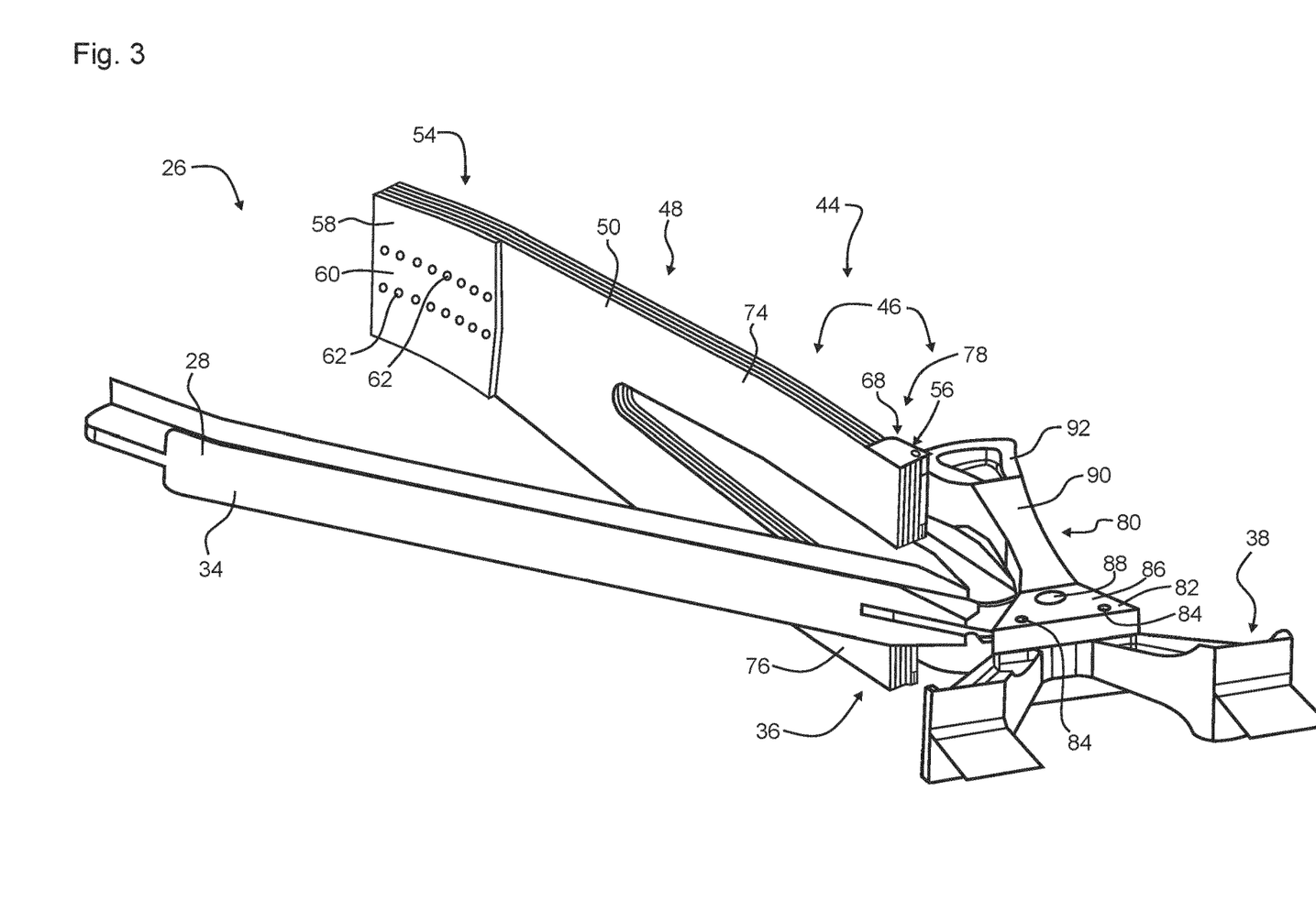
FIG. 3 shows a partial perspective view of an airfoil structure arrangement.
Figure 4:
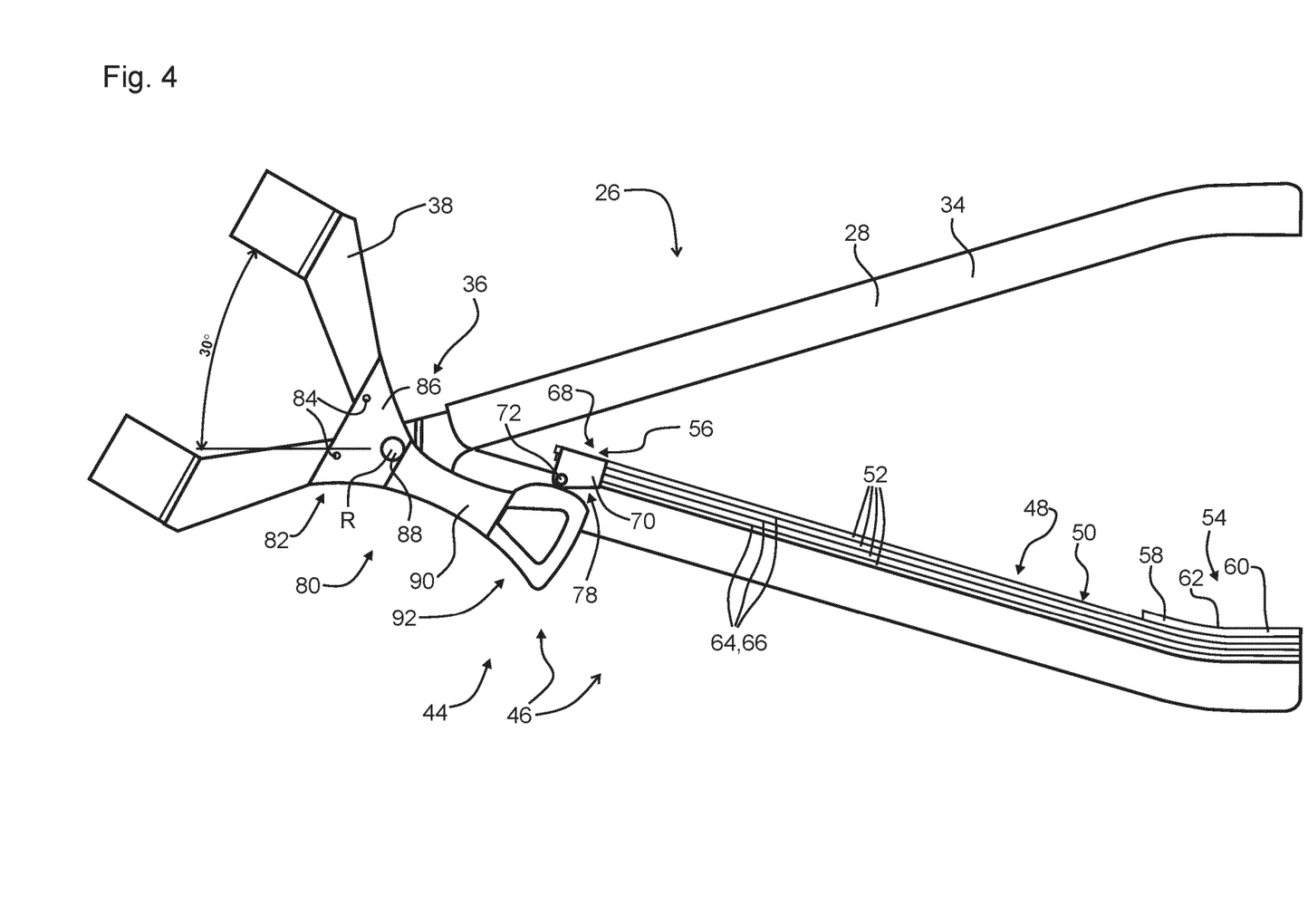
FIG. 4 shows a top view of the airfoil structure of FIG. 3.

FIGS. 3 and 4 depict the airfoil structure arrangement 26, which is provided with an antivibration device 44, which is preferably obtained by using an antivibration kit-of-parts 46.

The antivibration kit-of-parts 46 includes a spring device 48. The spring device 48 is configured to generate a spring force F, when the spring device is deflected from a spring neutral position, as shown for instance in FIGS. 3 and 4.

Figure 5:
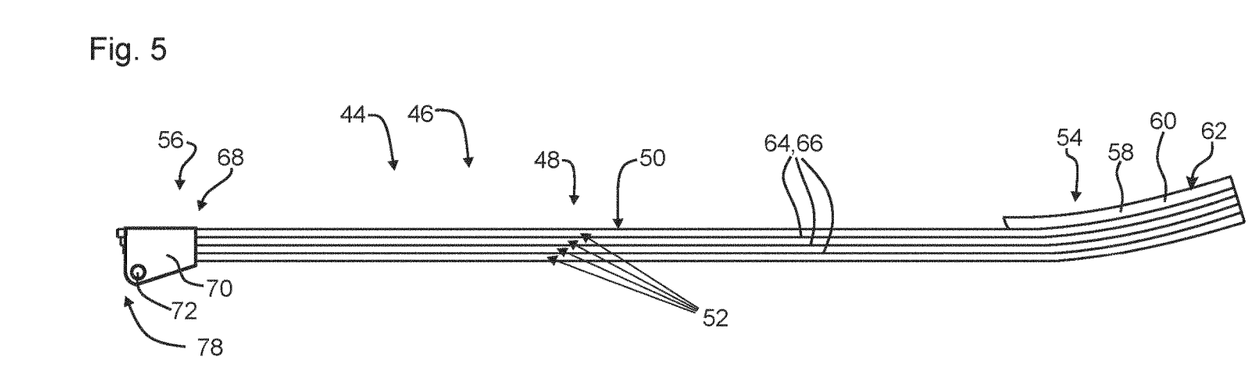
FIG. 5 shows a top view of a leaf spring.
Figure 6:
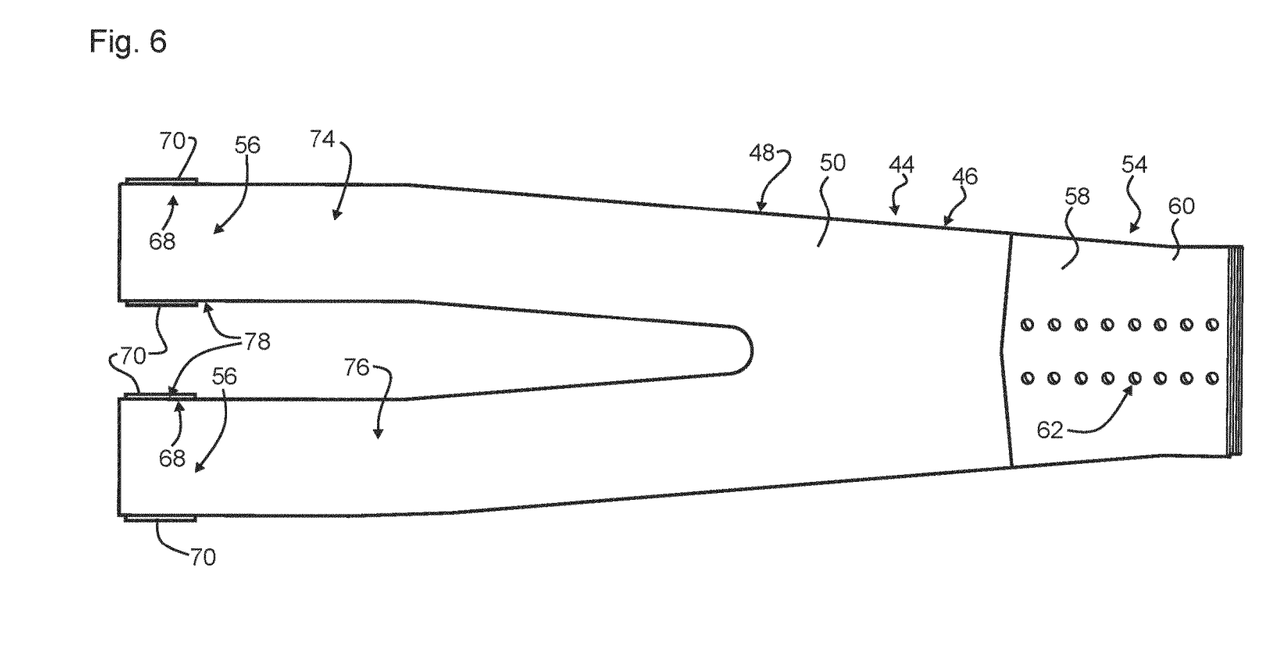
FIG. 6 shows a side view of a leaf spring.

The spring device 48 comprises a leaf spring 50. Preferably the leaf spring 50 is made from a fiber composite material. The leaf spring 50 comprises a plurality of leaf spring layers 52. The leaf spring layers 52 are fixed together at a fixed end portion 54 and free to slide relative to each other at a free end portion 56. Preferably the fixed end portion 54 and the free end portion 56 are spaced apart from each other along the longitudinal direction of the leaf spring 50. In other words, preferably the fixed end portion 54 and the free end portion 56 are arranged at opposite longitudinal ends of the leaf spring 50.

At the fixed end portion 54, the leaf spring 50 preferably comprises a reinforcement member 58. The reinforcement member 58 may be made of a light metal or metal alloy, such as aluminum or titanium or respective alloys thereof. The reinforcement member 58 may be formed as a reinforcement plate 60, which is shaped so as to follow the contour defined by the leaf spring 50.

The leaf spring layers 52 are fixed to each other via plurality of fixing bolts 62, which may also be used to fix the reinforcement member 58 to the leaf spring 50.

Furthermore, the leaf spring 50 may include a plurality of friction reducing members 64. The friction reducing members 64 are sandwiched between neighboring leaf spring layers 52. The friction reducing members 64 are preferably formed as a friction reducing foil 66. The friction reducing foil 66 is made of PTFE, for example.

The leaf spring 50 further comprises a leaf spring bracket 68, which is arranged at the free end portion 56. The leaf spring bracket 68 is preferably fixed to just one of the leaf spring layers 52 so that the remaining leaf spring layers 52 may slide relative to the leaf spring bracket 68. The leaf spring bracket 68 may comprise two side plates 70, which are fixed to the one leaf spring layer 52. The side plates 70 preferably extend along the whole thickness of the leaf spring 50, so as to support and guide the leaf spring layers 52 in a lateral direction relative to the longitudinal direction of leaf spring 50.

Furthermore, the leaf spring bracket 68 comprises a roller 72, which is preferably supported via the side plates 70.

In the present embodiment, the leaf spring 50 comprises an upper spring part 74 and a lower spring part 76, which substantially extend parallel along the mounting bracket 34 and are tilted upwards and downwards, respectively, so as to be able to cross the mounting bracket 34 and be deflected unimpaired. In the present embodiment, both the upper spring part 74 and lower spring part 76 are provided with the leaf spring bracket 68.

The leaf spring bracket 68 as an example of a contact portion 78 of the spring device 48, wherein the contact portion 78 is configured and arranged to contact a cam device 80. Reference is made to FIG. 3, FIG. 4 and FIGS. 7 to 10 for further details of the cam device 80.

Figure 7:
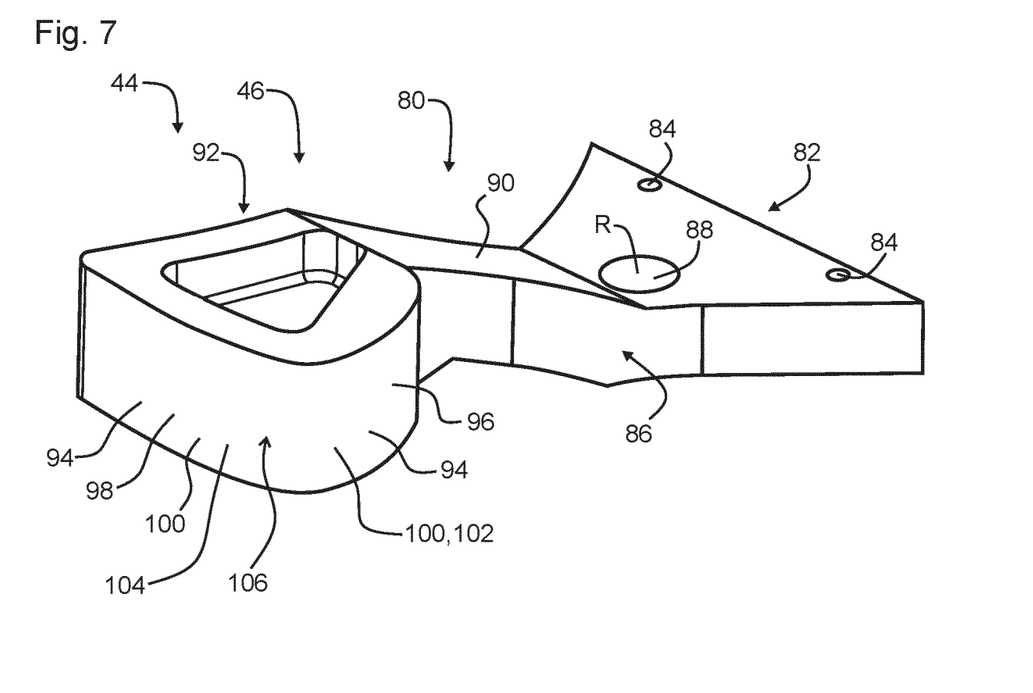
FIG. 7 shows a perspective view of a cam device.
Figure 8:
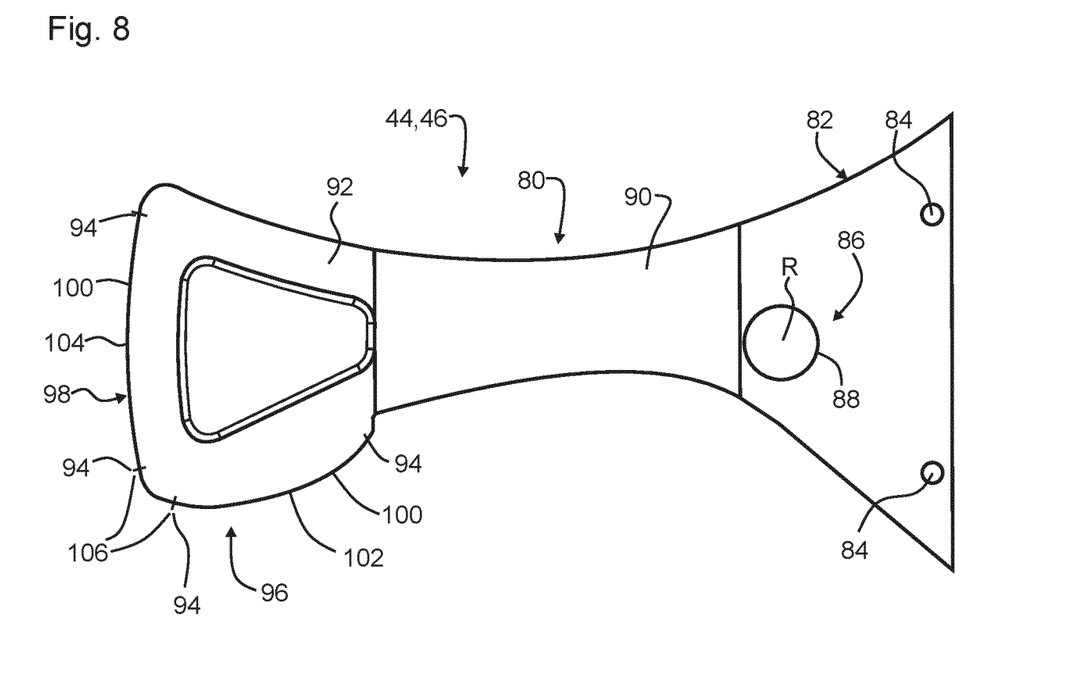
FIG. 8 shows a top view of the cam device of FIG. 7.
Figure 9:
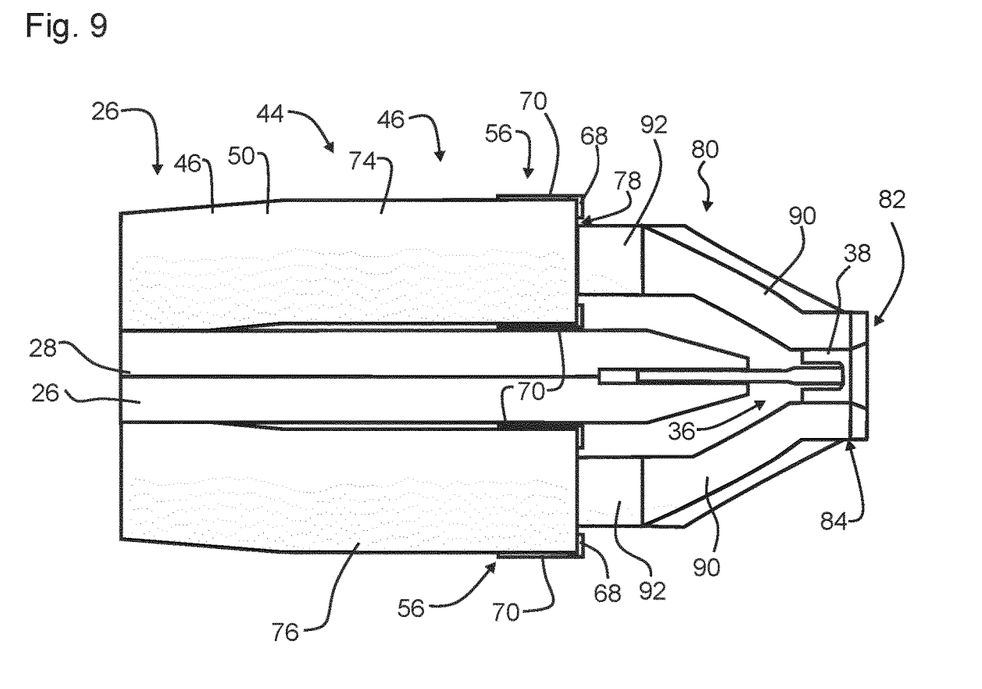
FIG. 9 shows a detailed side view of another airfoil structure.
Figure 10:
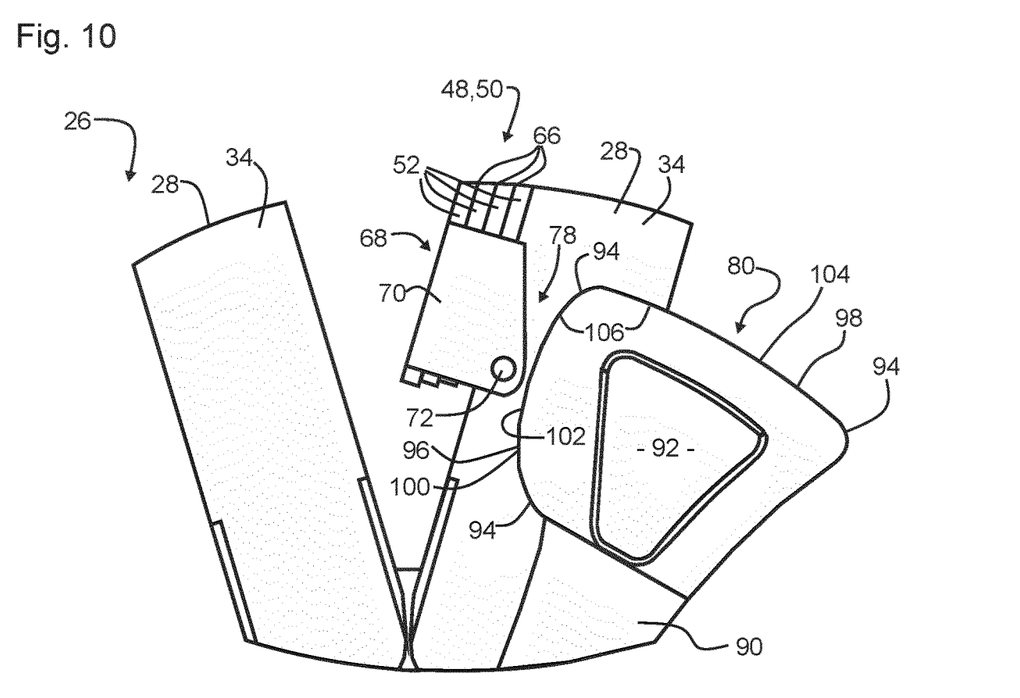
FIG. 10 shows a detailed top view of the airfoil structure of FIG. 9.

The cam device 80 comprises a cam device mounting portion 82. The cam device mounting portion 82 is configured to mount the cam device 80 to the airfoil structure 38. To this end, the cam device mounting portion 82 may comprise a plurality of mounting openings 84.

The cam device 80 is preferably configured or arranged to rotate about a rotational axis R, which coincides with the axis of rotation of the hinge 36. The cam device 80 may further comprise a hinge portion 86. The hinge portion 86 may define the rotational axis R. The hinge portion 86 is preferably formed as a hinge opening 88, which is arranged adjacent to the cam device mounting portion 82.

The cam device 80 furthermore comprises a lever portion 90, which extends from the hinge portion 86 and may be tilted with respect to a horizontal plane. The lever portion 90 contributes to transforming the spring force F into an airfoil torque M.

The cam device 80 may further comprise a head portion 92, which is adjacent to the lever portion 90 and spaced apart from the hinge portion 86 and the cam device mounting portion 82 via the lever portion 90.

The cam device 80 comprises a cam 94, which is preferably formed on the head portion 92. In particular, reference is made to FIG. 8. In a top view of the cam device 80, the cam 94 is formed on a single lateral side 96 of the cam device and a single front side 98 with respect to a longitudinal direction of the cam device 80.

The cam 94 comprises a stationary cam portion 100. The stationary cam portion 100 is shaped such that the angle of the spring force F remains unchanged, when the cam device 80 is moved about its rotational axis R.

The stationary cam portion 100 comprises an urging cam portion 102. The urging cam portion 102 is preferably arranged at the lateral side 96. The urging cam portion 102 directs the spring force F in such a manner that the spring force F points perpendicular with respect to a longitudinal direction of the aircraft 10, i.e., the front-rear-direction of the aircraft. Thus, the urging cam portion 102 keeps the angle relative to the front-rear-direction of the aircraft 10 stationary.

Furthermore, the stationary cam portion 100 comprises a neutral cam portion 104. The neutral cam portion 104 is preferably formed on the front side 98. The neutral cam portion 104 is shaped such that the spring force F points towards the rotational axis R. Thus, the spring force F does not exert a torque onto the airfoil structure 38.

The urging cam portion 102 and the neutral cam portion 104 extend for a length relating to a majority of the movement of the cam device 80. In other words, for a majority of the possible rotation of the cam device 80, the angle of the spring force relative to the aircraft longitudinal direction does not change.

Furthermore, the cam device 80 comprises a transition cam portion 106. The transition cam portion 106 is sandwiched between the urging cam portion 102 and the neutral cam portion 104. The transition cam portion 106 is shaped such that the direction of the spring force F changes between the two stationary states defined by the stationary cam portion 100, in particular the urging cam portion 102 and the neutral cam portion 104.

Figure 11:
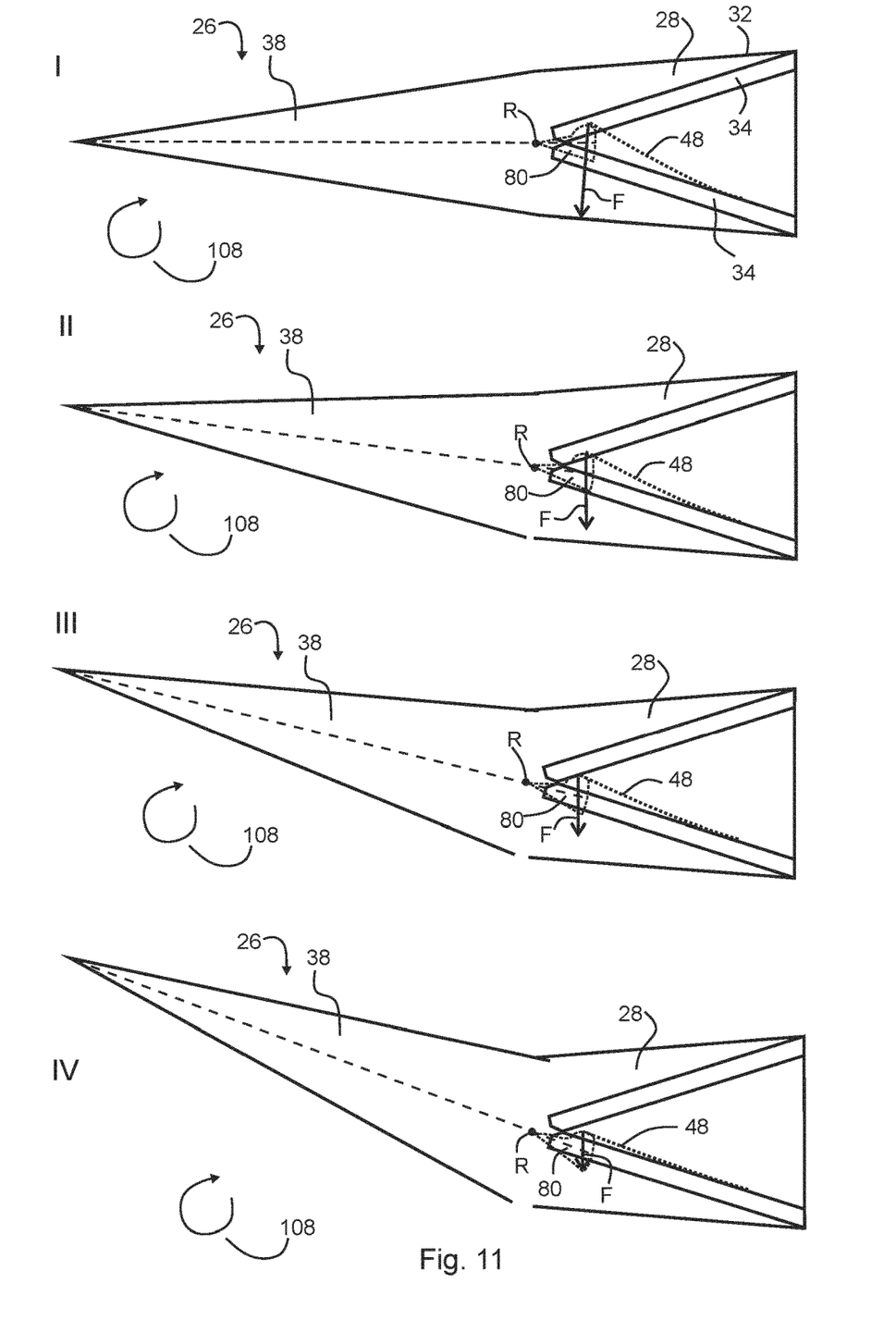
FIG. 11 and FIG. 12 show a sequence of positions I to V of the airfoil structure arrangement of FIG. 3 being moved in a first direction.
Figure 12:
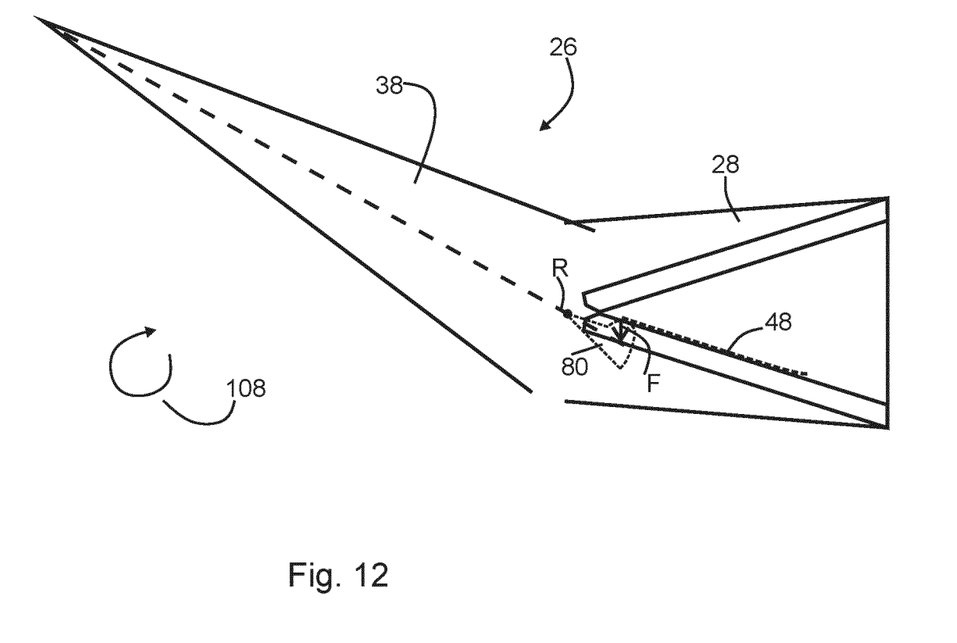

The function of the antivibration kit-of-parts 46 will be explained in further detail with reference to FIGS. 11 to 13.

Position I depicts the airfoil structure arrangement 26 in a neutral position. In other words, the airfoil structure 38 is in the neutral position and its angle with respect to the longitudinal direction of the aircraft 10 is 0°. Furthermore, the cam device 80 is also aligned in the cam device neutral position. The spring device 48, however, is not in its spring neutral position but in a deflected position, which generates the spring force F. The spring device 48 contacts the cam device 80 via the contact portion 78. As can be seen from position I, the contact portion 78 contacts the cam device 80 at the transition cam portion 106. Thus, the spring force F is transformed by the cam device 80 into an airfoil torque MI, wherein the spring force F is almost perpendicular with respect to the aircraft longitudinal direction.

Position II depicts the airfoil structure 38 rotated by some angle. Since the cam device 80 is mounted to the airfoil structure 38, the cam device 80 follows the rotational movement about the rotational axis R, so does the spring device 48. In this position II, the deflection of the spring device 48 is smaller and thus, the magnitude of the spring force F is also smaller.

Furthermore, in position II, the contact portion 78 now contacts the cam device 80 at the urging cam portion 102, which redirects the spring force F to be directed laterally with respect to the longitudinal direction of the aircraft 10. Thus, the spring device 48 causes an airfoil torque MII which is smaller than the airfoil torque MI.

As can be seen from positions III and IV, the more the airfoil structure 38 is rotated, the lesser the spring device 48 is deflected. Thus, the spring force F decreases, when the airfoil structure 38 is rotated in a first direction 108. The associated airfoil torques MIII and MIV are thus getting subsequently smaller and smaller.

Finally in position V, the airfoil structure 38 was rotated by a rather large angle, for example an angle of 30 degrees. In this position V, the cam device 80 barely contacts the spring device 48 so that the spring device 48 is almost in its neutral position. If the airfoil structure 38 is moved further, the spring force F and thus the airfoil torque will eventually become zero.

Figure 13:
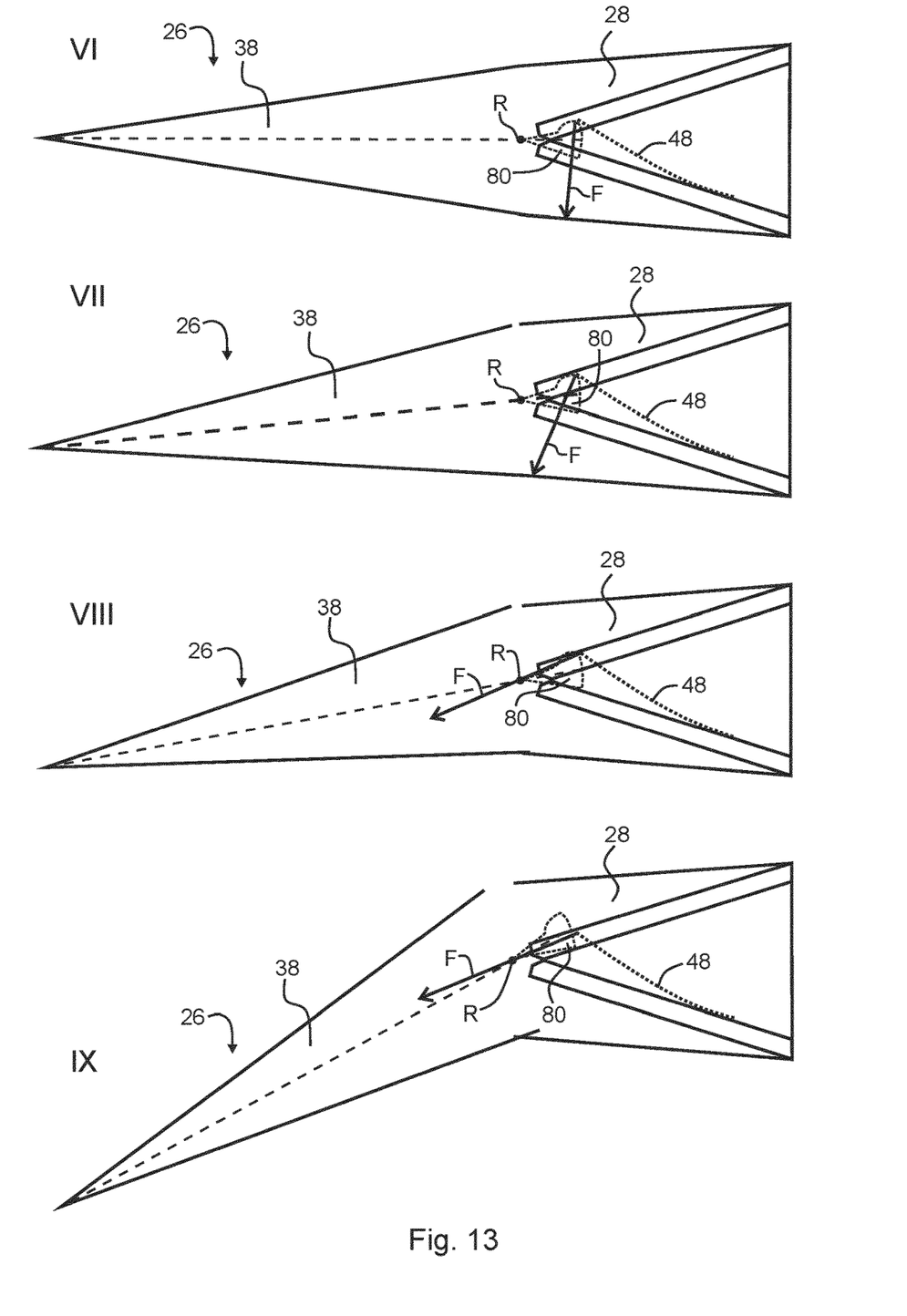
FIG. 13 shows a sequence of positions VI to IX of the airfoil structure arrangement of FIG. 3 being moved in a second direction.

Looking at FIG. 13, a movement of the airfoil structure 38 in a second direction 110 opposite to the first direction 108 is depicted. Initially position VI is the same as position I and is mainly shown for comparison.

In position VII, the airfoil structure 38 is moved by a small amount in the second direction 110, thereby moving the cam device 80 to increase deflection of the spring device 48. Thus, the spring force F increases due to a larger deflection of the spring device 48.

However, the contact portion 78 contacts the cam device 80 at the transition cam portion 106. Relative to position VI, the angle of the spring force F in position VII has changed substantially and is tilted more towards the rotational axis R of the airfoil structure 38. Thus, although the spring force F has increased, the airfoil torque MVII is smaller than the airfoil torque MVI, which is the same as the airfoil torque MI.

In position VIII, the contact portion 78 contacts the cam device 80 at the beginning of the neutral cam portion 104. The spring device 48 has now reached maximum deflection, and thus the spring force F is also at maximum. However, due to the neutral cam portion 104 the spring force F is directed towards the rotational axis R such that no effective lever arm is provided by the cam device 80. In other words, the airfoil torque MVIII is 0 Nm due to the redirection of the spring force F by the cam device 80, in particular, the neutral cam portion 104.

As depicted in position IX, the airfoil structure 38 can be rotated by a substantial amount, yet the airfoil torque MIX still equals 0 Nm, since the neutral cam portion 104 continuously directs the spring force F towards the rotational axis R.

As a result, the cam device 80 is configured such that an airfoil torque Mn only acts upon the airfoil structure 38 when it is rotated in the first direction 108, but not the second direction 110, apart from a small transition portion.

In order to reduce vibration of movable airfoil structures, such as rudders, elevators, and ailerons, a spring device, a leaf spring, for example, is mounted to a airfoil mounting structure, such as a vertical tail plane, horizontal tail plane or the wings, such that the spring device exerts a force on a cam device, which transforms the spring force into an airfoil torque. The airfoil torque is applied to the airfoil structure and thus reduces a risk of vibration or flutter. The cam device is configured to redirect the spring force such that when the airfoil structure is moved in a first direction, torque decreases and when moved in the opposite second direction the torque is zero.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage 14 wing
16 vertical tail plane (VTP)
18 horizontal tail plane (HTP)
20 aileron
22 rudder
24 elevator
26 airfoil structure arrangement
28 airfoil mounting structure
30 rib
32 aerodynamic skin
34 mounting bracket
36 hinge
38 movable airfoil structure
40 upper part
42 lower part
44 antivibration device
46 antivibration kit-of-parts
48 spring device
50 leaf spring
52 leaf spring layer
54 fixed end portion
56 free end portion
58 reinforcement member
60 reinforcement plate
62 fixing bolt
64 friction reducing member
66 friction reducing foil
68 leaf spring bracket
70 side plate
72 roller
74 upper spring part
76 lower spring part
78 contact portion
80 cam device
82 cam device mounting portion
84 mounting opening
86 hinge portion
88 hinge opening
90 lever portion
92 head portion
94 cam
96 lateral side
98 front side
100 stationary cam portion
102 urging cam portion
104 neutral cam portion
106 transition cam portion
108 first direction
110 second direction
F spring force
M, $M_N$, and
$M_I \ldots M_{IX}$ airfoil torque
R rotational axis

The invention claimed is:

1. An apparatus configured to reduce vibration of an airfoil structure, the airfoil structure being movably attachable to an aircraft, wherein the apparatus comprises:
a spring device configured to generate a spring force due to deflection from a spring neutral position of the spring device; and
a cam device configured to transform the spring force into an airfoil torque while, when both the spring device and the cam device are in an operating condition, the cam device contacts the spring device, and the cam device is configured to apply the airfoil torque to the airfoil structure while, when both the spring device and the cam device are in the operating condition, the cam device is operatively coupled to the airfoil structure,
wherein the cam device comprises a cam device mounting portion configured to mount the cam device to the airfoil structure and a hinge portion defining an axis of rotation about which the cam device is configured to rotate, and,
wherein the cam device further comprises a lever portion that extends from the hinge portion and that is configured to contribute in transforming the spring force into an airfoil torque, a head portion that is adjacent to the lever portion and spaced apart from the hinge portion via the lever portion, a cam that is formed on the head portion and the cam is formed on a single lateral side of the cam device and a single front side with respect to a longitudinal direction of the cam device.

2. The apparatus according to claim 1, wherein the cam device is configured to at least one of:
be rotatable about the axis of rotation, so as to transform the spring force into the airfoil torque;
transform the spring force into the airfoil torque being nonzero, when the cam device is moved from a cam device neutral position in a first direction but not another direction;
transform the spring force into the airfoil torque being zero when the cam device is moved from a cam device neutral position in a second direction but not another direction, although the spring device stays in contact with the cam device; or
transform the spring force into the airfoil torque being zero by directing the spring force to point towards the axis of rotation.

3. The apparatus according to claim 1, wherein, when both the spring device and the cam device are in the operating condition,
the spring device is deflected when the cam device is in a cam device neutral position;
the deflection of the spring device decreases when the cam device is moved from a cam device neutral position in a first direction but not another direction;
the deflection of the spring device stays the same, when the cam device is moved from a cam device neutral position in a second direction but not another direction; or
the deflection of the spring device initially increases and subsequently stays the same, when the cam device is moved from a cam device neutral position in a second direction but not another direction.

4. The apparatus according to claim 1, wherein the spring device comprises a leaf spring configured to generate the spring force.

5. The apparatus according to claim 1, wherein the leaf spring
comprises a plurality of leaf spring layers stacked on each other in a sliding manner;
has a fixed end portion, at which the leaf spring layers are fixed to each other;
has a free end portion, at which the leaf spring layers are free to slide relative to each other;
comprises a friction reducing member sandwiched between two neighboring leaf spring layers; or
has a leaf spring bracket configured to support the leaf spring layers in a sliding manner.

6. The apparatus according to claim 5, wherein at least one of:

the spring device comprises a contact portion arranged to contact the cam device, so as to transfer the spring force to the cam device; or the spring device comprises a reinforcement member configured to reinforce the spring device.

7. The apparatus according to claim 6, wherein the contact portion is arranged at the free end or the leaf spring bracket;

wherein the contact portion comprises a roller, which contacts the cam device; or wherein the reinforcement member is arranged at the fixed end portion.

8. The apparatus according to claim 1, wherein the cam device comprises a cam portion configured to direct the spring force in such a manner that, when the cam device is in the operating condition, the spring force is directed in the same direction relative to the aircraft for a majority of a movement of the cam device relative to the aircraft.

9. An airfoil structure arrangement for an aircraft, the airfoil structure arrangement comprising an airfoil mounting structure, an airfoil structure movably mounted to the airfoil mounting structure, and the apparatus according to claim 1, wherein the spring device is mounted to the airfoil structure and the cam device is mounted to the airfoil structure.

10. The airfoil structure arrangement according to claim 9, wherein at least one of:

the cam portion comprises an urging cam portion configured to direct the spring force such that the spring force is directed parallel to a lateral direction of the aircraft; or the cam portion comprises a neutral cam portion configured to direct the spring force such that the spring force is directed towards an axis of rotation of the cam device.

11. The airfoil structure arrangement according to claim 10, wherein the spring force is directed in a left-right direction.

12. The airfoil structure arrangement according to claim 10, wherein the spring force is directed in a top-bottom direction.

13. The airfoil structure arrangement according to claim 10, wherein the airfoil mounting structure comprises at least one of a wing, a vertical tail plane, or a horizontal tail plane, and wherein the airfoil structure comprises a control surface or high lift device.

14. An aircraft, in particular airplane, comprising an airfoil structure according to claim 9.

15. A cam device for use in an apparatus configured to reduce vibration of an airfoil structure, the airfoil structure being movably attachable to an aircraft, wherein the cam device comprises:

a cam device mounting portion configured to mount the cam device to an airfoil structure, a hinge portion defining an axis of rotation about which the cam device is rotatable, and a cam portion configured to direct a spring force exerted on the cam portion in such a manner that, when the cam device is in the operating condition, the spring force is directed in the same direction relative aft, wherein the cam device further comprises a lever portion that extends from the hinge portion and that is configured to contribute in transforming the spring force into an airfoil torque, a head portion that is adjacent to the lever portion and spaced apart from the hinge portion via the lever portion, a cam that is formed on the head portion and the cam is formed on a single lateral side of the cam device and a single front side with respect to a longitudinal direction of the cam device.

16. An apparatus configured to reduce vibration of an airfoil structure, the airfoil structure being movably attachable to an aircraft, wherein the apparatus comprises:

a spring device configured to generate a spring force due to deflection from a spring neutral position of the spring device; and a cam device configured to transform the spring force into an airfoil torque while, when both the spring device and the cam device are in an operating condition, the cam device contacts the spring device, and the cam device is configured to apply the airfoil torque to the airfoil structure while, when both the spring device and the cam device are in the operating condition, the cam device is operatively coupled to the airfoil structure, wherein the spring device comprises a leaf spring configured to generate the spring force, wherein the leaf spring comprises a plurality of leaf spring layers stacked on each other in a sliding manner; has a fixed end portion, at which the leaf spring layers are fixed to each other; has a free end portion, at which the leaf spring layers are free to slide relative to each other; comprises a friction reducing member sandwiched between two neighboring leaf spring layers; or has a leaf spring bracket configured to support the leaf spring layers in a sliding manner.

17. The apparatus according to claim 16, wherein at least one of:

the spring device comprises a contact portion arranged to contact the cam device, so as to transfer the spring force to the cam device; or the spring device comprises a reinforcement member configured to reinforce the spring device.

18. The apparatus according to claim 17, wherein the contact portion is arranged at the free end or the leaf spring bracket;

wherein the contact portion comprises a roller, which contacts the cam device; or wherein the reinforcement member is arranged at the fixed end portion.

* * * * *